(12) United States Patent
Diehl

(10) Patent No.: US 11,166,420 B1
(45) Date of Patent: Nov. 9, 2021

(54) HYDROPONIC GROWTH SYSTEM

(71) Applicant: Patrick Allan Diehl, Miami, FL (US)

(72) Inventor: Patrick Allan Diehl, Miami, FL (US)

(*) Notice: Subject to any disclaimer, the term of this patent is extended or adjusted under 35 U.S.C. 154(b) by 788 days.

(21) Appl. No.: 15/919,271

(22) Filed: Mar. 13, 2018

(51) Int. Cl.
*A01G 31/06* (2006.01)
*A01G 31/00* (2018.01)

(52) U.S. Cl.
CPC ........ *A01G 31/06* (2013.01); *A01G 2031/006* (2013.01)

(58) Field of Classification Search
CPC ........ A01G 31/06; A01G 9/023; A01G 9/022; A01G 9/025; A01G 31/047; A01G 31/02; A01G 9/00; A01G 9/104; Y02P 60/216; Y02P 60/244
USPC .......................................................... 47/66.7
See application file for complete search history.

(56) References Cited

U.S. PATENT DOCUMENTS

| | | | | |
|---|---|---|---|---|
| 4,184,479 A * | 1/1980 | Ratliff, Jr. | ............... | A01G 9/243 126/605 |
| 4,622,777 A * | 11/1986 | Greene, Jr. | ............ | A01G 9/022 47/67 |
| 4,986,027 A | 1/1991 | Harvey | | |
| 6,293,048 B1* | 9/2001 | Boulter | ................... | A01G 31/02 47/62 E |
| 2003/0089037 A1* | 5/2003 | Ware | ....................... | A01G 9/025 47/83 |
| 2004/0010971 A1* | 1/2004 | Redfield | ................ | A01G 9/022 47/83 |
| 2006/0162252 A1* | 7/2006 | Lim | ...................... | A01G 31/045 47/59 R |
| 2012/0167460 A1* | 7/2012 | Omidi | ................... | A01G 25/165 47/65.7 |
| 2015/0334930 A1* | 11/2015 | Stoltzfus | ................ | A01G 9/022 47/62 A |
| 2016/0135394 A1* | 5/2016 | Wagner | ................... | A01G 9/022 47/62 R |
| 2016/0135398 A1* | 5/2016 | Mathieu | ................. | A01G 9/023 47/62 R |
| 2017/0013787 A1* | 1/2017 | Diehl | ...................... | A01G 9/022 |
| 2017/0105372 A1* | 4/2017 | Bryan, III | ............. | A01G 31/02 |

* cited by examiner

*Primary Examiner* — Peter M Poon
*Assistant Examiner* — Jeffrey R Larsen
(74) *Attorney, Agent, or Firm* — Sanchelima & Associates, P.A.; Christian Sanchelima; Jesus Sanchelima

(57) ABSTRACT

A hydroponic growth system comprises grow tubes and a misting assembly. Each of the grow tubes, of a generally hollow cylindrical configuration, are mounted vertically on a support assembly and comprise openings configured on an outer surface of the grow tube for receiving receptacles containing plants. Each of the grow tubes comprise a top vent and a bottom vent. The misting assembly comprises spray tubes inserted into a middle section of the grow tubes to distribute and spray a nutrient solution into an inner surface of each of the grow tubes. The nutrient solution is absorbed by roots of the one or more plants extending into the inner surface of the grow tubes. Unused nutrient solution is drained into a sump positioned beneath the grow tubes via the bottom vents and recirculated within the misting assembly for spraying the nutrient solution to grow the plants.

14 Claims, 6 Drawing Sheets

HYDROPONIC GROWTH SYSTEM

I. BACKGROUND OF THE INVENTION

1. Field of the Invention

Figure 1A:
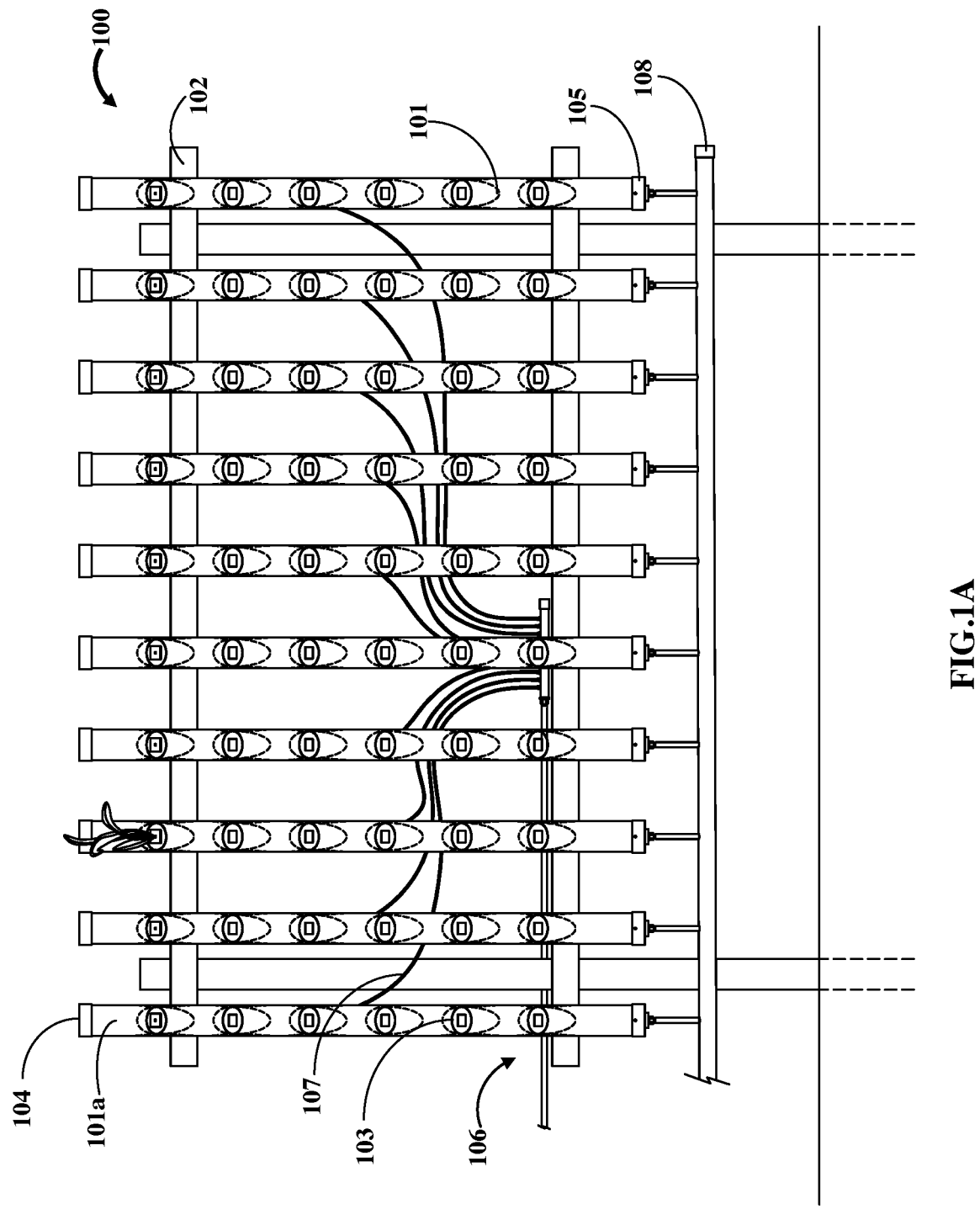

The present disclosure generally relates to hydroponic systems. More particularly, the present disclosure relates to a hydroponic growth system including a plurality of grow tubes with a reusable water circuit.

2. Description of the Related Art

Hydroponics refers to a method of growing plants without soil. Existing devices have been used to ensure plant growth using hydroponics. Typically, a nutrient rich solution is supplied to several receptacles containing one or more plants. With increasing population and the reducing availability of arable land, it is highly essential that productivity of such devices be increased with minimum increase in use of land and other resources. Although several existing devices have attempted to address the above-mentioned need, most have failed to provide a complete and inexpensive solution. For instance, U.S. Pat. No. 4,622,777 issued to George J. Greene discloses a rotatable planter including a thermoplastic tube with a plurality of pockets therein. The rotatable planter is rotatable either by the wind to which it is exposed or by a stand on which it is supported.

In another related reference, U.S. Pat. No. 4,986,027 issued to Roy Harvey, there is disclosed a structure for supporting the growth of plants, comprising a flexible tubular element in the wall of which slits are provided. Closure means define with the tubular element an elongated enclosed area that is filled with a fluid and root permeable material for supporting the roots of plants. A fluid nutrient is supplied by a pump to the material. The tubular element may be suspended from one of its ends and supplied at the upper end with the fluid nutrient to support plant growth through the perforations from the particulate material. However, the prior art does not teach a nutrient solution circuit that is reclaimed, reused, and supplied with minimum waste in the form of vapor. Further, grow tubes of several sizes and configurations capable of accommodating numerous plants which can be commercially scaled based on requirement is a feature of the present invention that is absent in the prior art.

Other documents describing the closest subject matter provide for several complicated features that fail to solve the problem in an efficient and economical way. Hence, there is a long felt but unresolved need for a device, which offers maximum productivity with minimum space requirements. Furthermore, there is a need for a device, which recycles and reuses nutrient solutions configured to be supplied to plant thereby ensuring efficient use of resources.

II. SUMMARY OF THE INVENTION

The invention, disclosed herein, addresses the above-mentioned need for a device, which offers maximum productivity with minimum space requirements. Furthermore, there is a need for a device, which recycles and reuses nutrient solutions configured to be supplied to plant thereby ensuring efficient use of resources.

A hydroponic growth system comprises a plurality of grow tubes, a support assembly, a misting assembly, and a sump. The plurality of grow tubes mounted vertically on a support assembly. Each of the grow tubes are of a generally hollow cylindrical configuration. The each of the grow tubes comprise a plurality of openings configured on an outer surface of the grow tube for receiving receptacles containing one or more plants. Each of the grow tubes comprise a top vent and a bottom vent. The misting assembly comprises a plurality of spray tubes inserted into a middle section of each of the grow tubes. Further, the spray tubes are configured to distribute and spray a nutrient solution into an inner surface of each of the grow tubes. The nutrient solution is absorbed by roots of the one or more plants extending into the inner surface of each of the grow tubes. The unused nutrient solution is drained into a sump positioned beneath the grow tubes via the bottom vents and recirculated within the misting assembly for spraying the nutrient solution to grow the one or more plants.

Further objects of the invention will be brought out in the following part of the specification, wherein detailed description is for the purpose of fully disclosing the invention without placing limitations thereon.

III. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1A exemplarily illustrates a front elevation view of a hydroponic growth system mounted on a support assembly.

Figure 1B:
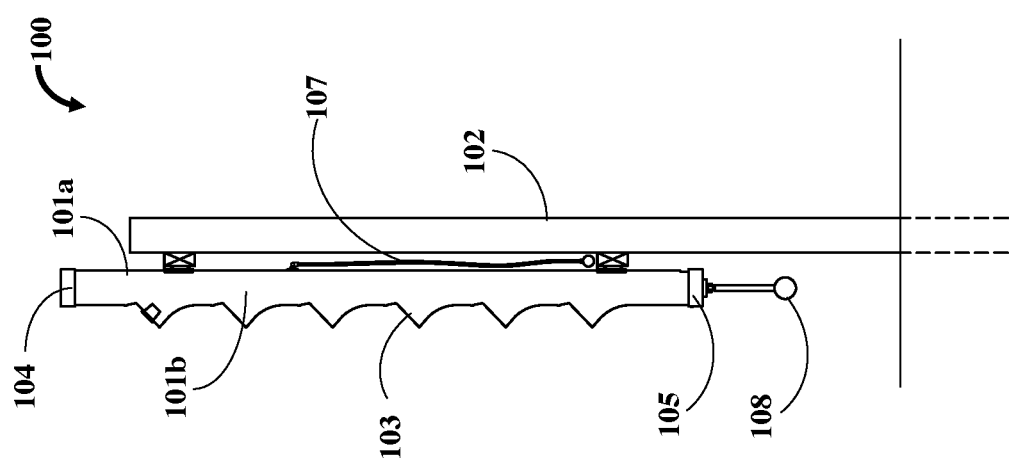

FIG. 1B exemplarily illustrates a right-side elevation view of a hydroponic growth system.

Figure 2:
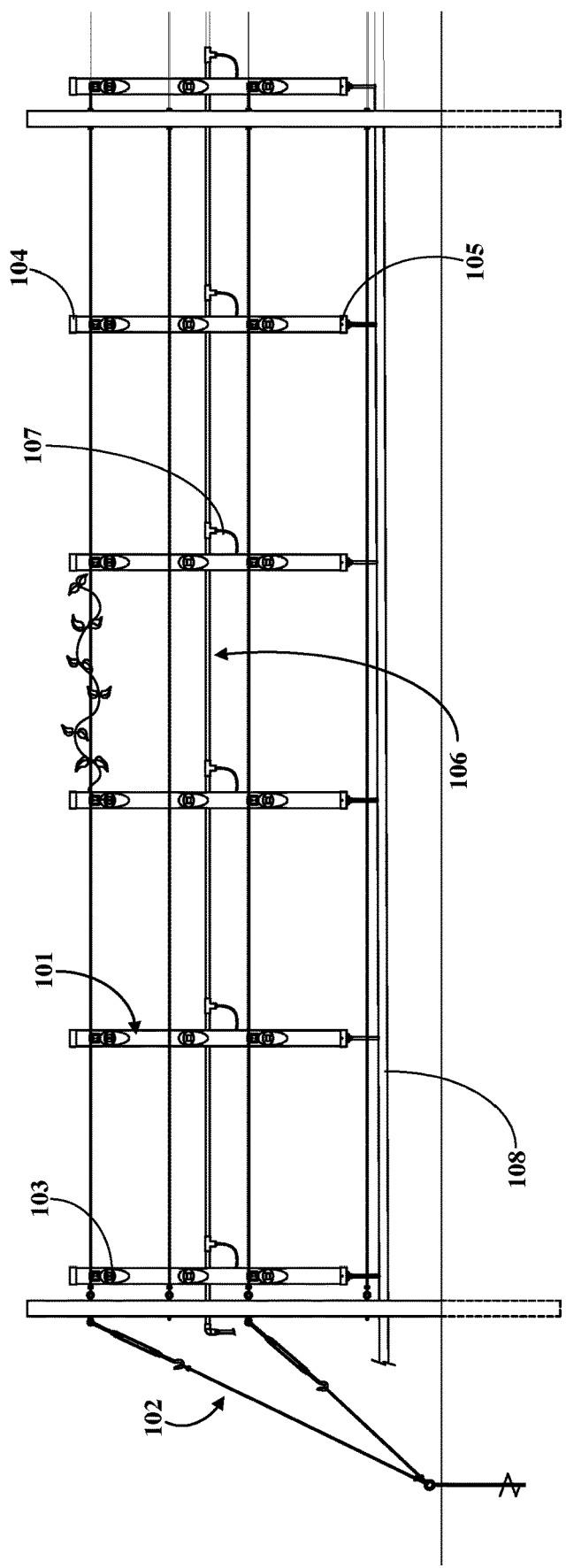

FIG. 2 exemplarily illustrates a front elevation view of a hydroponic growth system.

Figure 3A:
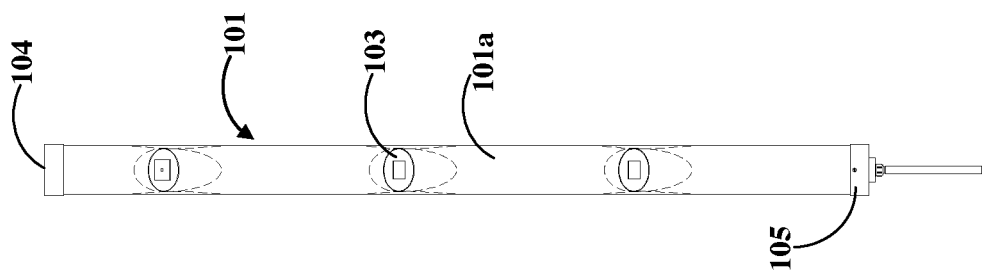

FIG. 3A exemplarily illustrates a front elevation view of a grow tube of a hydroponic growth system.

Figure 3B:
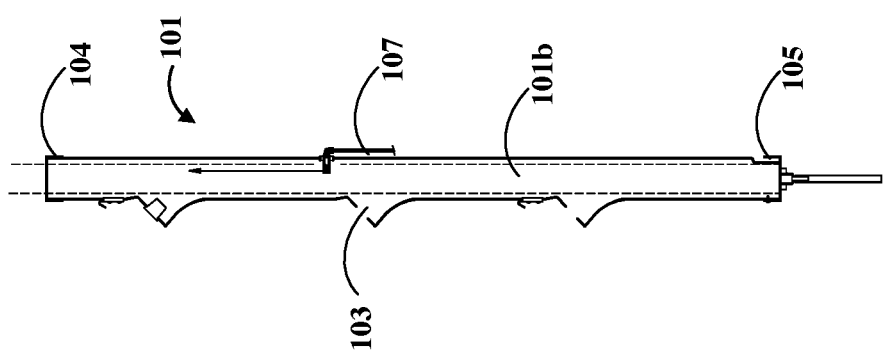

FIG. 3B exemplarily illustrates a right side sectional view of a grow tube of a hydroponic growth system.

Figure 4:
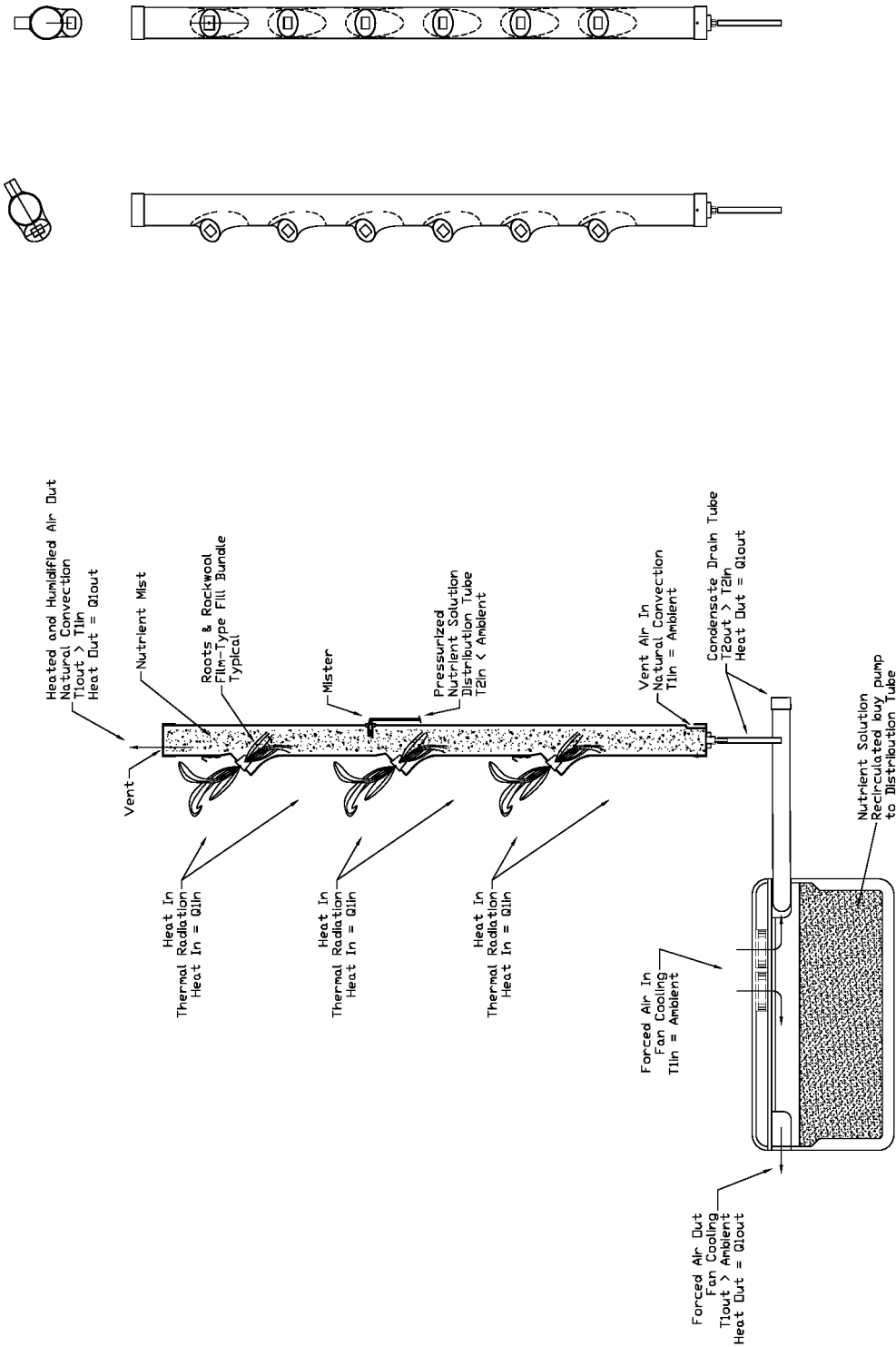

FIG. 4 exemplarily illustrates the cooling system mounted to or integrated with the reservoir in its operating environment.

IV. DETAILED DESCRIPTION OF THE EMBODIMENTS OF THE INVENTION

FIG. 1A exemplarily illustrates a front elevation view of a hydroponic growth system 100 mounted on a support assembly. FIG. 1B exemplarily illustrates a right-side elevation view of a hydroponic growth system 100. The hydroponic growth system 100 comprises a plurality of grow tubes 101 mounted on a support assembly 102. The support assembly 102 is shown as a frame member capable of bearing the load applied by the grow tubes 101. In different embodiments of the present invention, several types of support assemblies 102 may be used based on space requirements or other functional requirements. In the present disclosure, only two such embodiments have been discussed in detail. As used herein, "grow tubes" refer to hollow tubular structures configured to support and nourish a plurality of plants. The grow tubes 101 are of a generally hollow cylindrical configuration. However, it may be appreciated several other configurations, for example, hollow cuboidal, hollow elliptical, etc., may be used instead based on design or other functional requirements. In an embodiment, the grow tubes 101 are mounted vertically on the support assembly 102.

Each of the grow tubes 101 comprise a plurality of openings 103 configured on an outer surface 101*a* of the grow tube 101. The openings 103 are circular in geometry and configured to receive receptacles/containers containing one or more plants. In an embodiment, the rear surface of the grow tubes 101 are detachably or fixedly attached to the support assembly 102. Each of the grow tubes 101 comprise a top vent 104 and a bottom vent 105. The hydroponic growth system 100 further comprises a misting assembly 106. The misting assembly 106 further comprises a plurality of spray tubes 107. The spray tubes 107 are inserted into a middle section of each of the grow tubes 101 as exemplarily illustrated in FIGS. 1A-1B. The spray tubes 107 contain a nutrient solution that is sprayed into the inner surface 101*b* of the grow tube 101 as exemplarily illustrated in FIG. 1B. The nutrient solution is sprayed into a section of the grow tube 101 proximal to the top vent 104. The one or more plants placed within the receptacles mounted on the circular openings 103 have roots extending into the inner surface 101*b* of the grow tube 101. The nutrient solution sprayed into the inner surface 101*b* of the grow tube 101 is absorbed by the roots of the plant. The unused nutrient solution is drained into a sump 108 positioned beneath the grow tubes 101 via the bottom vent 105 and recirculated within the misting assembly 106.

FIG. 2 exemplarily illustrates a front elevation view of a section of a hydroponic growth system 100 having a different form of support assembly 102. In the embodiment illustrated in FIG. 2, the support assembly 102 is a tensioned cable structure having hangers to mount the grow tubes 101. The rear of the grow tube 101 can be mounted on the support assembly 102 to hang the grow tube 101 vertically or on the front of the grow tube 101 to be hung on a tension cable. If the support assembly 102 is positioned on the front of the grow tubes 101 then the tensioned cables of the support assembly 102 can serve the double purpose of being used to allow vines to grow along the tension cables as exemplarily illustrated in FIG. 2. The openings 103 are circular in geometry and configured to receive receptacles/containers containing one or more plants. Each of the grow tubes 101 comprise a top vent 104 and a bottom vent 105. The hydroponic growth system 100 further comprises a misting assembly 106 having multiple spray tubes 107. The spray tubes 107 are inserted into a middle section of each of the grow tubes 101 as exemplarily illustrated in FIGS. 1A-1B. The spray tubes 107 contain a nutrient solution that is sprayed into the inner surface 101*b* of the grow tube 101 as exemplarily illustrated in FIG. 1B. The nutrient solutions that is unused is drained into the sump 108 via the bottom vent and recirculated again back to the spray tubes 107 by a pumping mechanism.

FIG. 3A exemplarily illustrates a front elevation view of a grow tube 101 of a hydroponic growth system 100. FIG. 3B exemplarily illustrates a right-side sectional view of a grow tube 101 of a hydroponic growth system 100. The agricultural grow tubes 101 have bottom vents 105 and top vents 104. The bottom vent 105 has an indentation with a through hole thereon to allow venting at the bottom of the grow tube 101. The circular openings 103 on the front of the grow tube 101 are used to insert plants using a circular basket that is received by the circular opening 103. In another embodiment, the circular openings 103 can be square shaped to cooperate with plants having a square root configuration called "grow plugs". The top vent 104 can include a cap with larger size or smaller size openings as the grow tube 101 requires. The misting assembly 106, exemplarily illustrated in FIGS. 1A and 2, shoots a mist upwards which then falls back down to cover all the plant roots growing inside the grow tube 101. The grow tube 101 can further include a solar powered motor to run the motor of the misting assembly 106, a nutrition solution reclamation circuit or sump 108 as exemplarily illustrated in FIGS. 1A-2 that catches the nutrition solution at the base of the grow tube 101 and recirculates it throughout the hydroponic growth system 100 to recycle the solution.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An agricultural grow tube, comprising:
   a) a plurality of hollow grow tubes having a top end and a bottom end, each hollow grow tube of said plurality of grow tubes having a plurality of protrusions between said top end and said bottom end, each of said protrusions having a grow basket opening, said grow basket opening having a shape of a square, said grow basket opening being adapted to receive a grow basket,
   each hollow grow tube of said plurality of hollow grow tubes having a front side and a rear side, and said protrusions located at said front side, said rear side includes a rear opening, the bottom end including a bottom cap, said bottom cap fitting loosely around said bottom end, said bottom cap having a bottom cap opening, said bottom cap opening receiving a drain tube, the bottom end including a bottom distal end having a rear cut, said bottom distal end including a bottom vent, said bottom vent having an indentation with an through hole thereon to allow venting at the bottom of each hollow grow tube of the plurality of hollow grow tubes, said bottom vent being formed between the rear cut and a sidewall of the bottom cap;
   b) a pressurized misting assembly mounted to said rear opening, wherein said rear opening and misting assembly are located on said rear side at a midpoint of each hollow grow tube of the plurality of hollow grow tubes and configured to spray a mist, said misting assembly further including a spray tube inserted within said rear opening, said spray tube located entirely between the top end and the bottom end of each hollow grow tube of said plurality of hollow grow tubes;
   c) a reservoir filled with a nutrient solution, said reservoir having a cuboid shape with rounded edges;
   d) said reservoir connected to said misting assembly;
   e) a cooling system mounted to or integrated with said reservoir, said cooling system is mounted to or integrated with top side of said reservoir, said cooling system including at least one fan, said at least one fan is located on an opening on a top portion of the reservoir, said at least one fan is parallel to the top side of the reservoir, said at least one fan is adapted to force cool air into said reservoir through one top opening, said reservoir having a left opening and a right opening, located below said top side of the reservoir, said left opening is adapted to allow heated air to transfer out, said right opening is adapted to transfer the hot air to a sump;
   f) said misting assembly configured to spray said nutrient solution upwards, downwards, or a combination of both directions;

g) a support assembly including a rectangular frame member capable of bearing the plurality of hollow grow tubes, said frame member including a plurality of vertical posts and a plurality of horizontal posts, each vertical post of the plurality of vertical posts is removably and perpendicularly mounted to a surface, each horizontal post of the plurality of horizontal posts is perpendicularly attached to a front portion of the plurality of vertical posts, the rear side of each hollow grow tube of the plurality of hollow grow tubes is mounted to a front portion of the plurality of horizontal posts, an upper distal end of each hollow grow tube of the plurality of hollow grow tubes extend beyond a upper horizontal posts of the plurality of horizontal posts, a lower distal end of each hollow grow tube of the plurality of hollow grow tubes extend beyond a lower horizontal post of the plurality of horizontal posts;

h) said sump is connected to said reservoir and to said drain tube of each hollow grow tube of the plurality of hollow grow tubes, said sump is a cylindrical tube having a plurality of openings to receive said drain tube, said sump being larger than one of said plurality of horizontal posts, said sump being entirely below the plurality of hollow grow tubes; and i) a main supply line extending from said reservoir, a distribution manifold connected to said main supply line, a feeder tube extending from said misting assembly, said feeder tube connected to a distribution manifold.

2. The agricultural grow tube of claim 1 wherein said opening includes a gasket surrounding a rim of said opening adapted so that water does not leak out of the grow tube.

3. The agricultural grow tube of claim 1 wherein said plurality of protrusions are angled upwards towards said top end.

4. The agricultural grow tube of claim 1 wherein said rear opening includes a bushing adapted to seal the rear opening.

5. The agricultural grow tube of claim 1 wherein said misting assembly is adapted to spray the nutrient solution upwards.

6. The agricultural grow tube of claim 1 wherein said reservoir is connected to a pump, said pump delivers the chilled nutrient solution to said misting assembly.

7. The agricultural grow tube of claim 1 further including a first post and a second post, at least one cable extending perpendicularly from said first post to said second post, and at least one hook on said front side adapted to allow said grow tube to hang on said cable.

8. The agricultural grow tube of claim 1 further including a first post and a second post, at least one cable extending perpendicularly from said first post to said second post, and further including a first hook and a second hook located on said front or rear side, a first cable and a second cable, said first hook and said second hook adapted to support the weight of said grow tube as said first and second hook engage to said first and second cable, respectively.

9. The agricultural grow tube of claim 7 further including an anchoring system having an anchoring member inserted a predetermined depth into a ground surface, at least one structure support cable extending from said anchoring member to at least one anchoring point on said post.

10. The agricultural grow tube of claim 7 wherein said drain tube is secured to said first or second post using a strap.

11. The agricultural grow tube of claim 6 wherein said pump includes a motor that is powered by solar cells.

12. The agricultural grow tube of claim 1 wherein said cooling system includes a chiller system.

13. The agricultural grow tube of claim 1 wherein said reservoir includes at least one incoming cool air opening and at least one outgoing warmer air opening, said cooling system including at least one fan adapted to force cool air into said reservoir through said at least one incoming cool air opening, thereby transferring the warmer air out of said reservoir through said at least one warmer outgoing opening.

14. An agricultural grow tube, consisting of:
a) a plurality of hollow grow tubes having a top end and a bottom end, each hollow grow tube of said plurality of grow tubes having a plurality of protrusions between said top end and said bottom end, each of said protrusions having a grow basket opening, said grow basket opening having a shape of a square, said grow basket opening being adapted to receive a grow basket, each hollow grow tube of said plurality of hollow grow tubes having a front side and a rear side, and said protrusions located at said front side, said rear side includes a rear opening, the bottom end including a bottom cap, said bottom cap fitting loosely around said bottom end, said bottom cap having a bottom cap opening, said bottom cap opening receiving a drain tube, the bottom end including a bottom distal end having a rear cut, said bottom distal end including a bottom vent, said bottom vent having an indentation with an through hole thereon to allow venting at the bottom of each hollow grow tube of the plurality of hollow grow tubes, said bottom vent being formed between the rear cut and a sidewall of the bottom cap;

b) a pressurized misting assembly mounted to said rear opening, wherein said rear opening and misting assembly are located on said rear side at a midpoint of each hollow grow tube of the plurality of hollow grow tubes and configured to spray a mist, said misting assembly further including a spray tube inserted within said rear opening, said spray tube located entirely between the top end and the bottom end of each hollow grow tube of said plurality of hollow grow tubes;

c) a reservoir filled with a nutrient solution, said reservoir having a cuboid shape with rounded edges;

d) said reservoir connected to said misting assembly;

e) a cooling system mounted to or integrated with said reservoir, said cooling system is mounted to or integrated with top side of said reservoir, said cooling system including at least one fan, said at least one fan is located on a top portion of the reservoir, said at least one fan is parallel to the top side of the reservoir, said at least one fan is adapted to force cool air into said reservoir through one top opening, said reservoir having a left opening and a right opening, located below said top side of the reservoir, said left opening is adapted to allow heated air to transfer out, said right opening is adapted to transfer the hot air to a sump;

f) said misting assembly configured to spray said nutrient solution upwards, downwards, or a combination of both directions;

g) a support assembly including a rectangular frame member capable of bearing the plurality of hollow grow tubes, said frame member including a top post, a bottom post, a left post and a right side post, the left post and the right side post are removably and perpendicularly mounted to a surface, the top post is attached to a top frontal portion of the left post and to a top frontal portion of the right side post, the bottom post is attached to a bottom frontal portion of the left post and to a bottom frontal portion of the right side post, the rear side of each hollow grow tube of the plurality of hollow grow tubes is mounted to a front portion of the top post and to a front portion of the bottom post, an upper distal end of each hollow grow tube of the plurality of hollow grow tubes extend beyond the top post, a lower distal end of each hollow grow tube of the plurality of hollow grow tubes extend beyond the bottom post;

h) said sump is connected to said reservoir and to said drain tube of each hollow grow tube of the plurality of hollow grow tubes, said sump is a cylindrical tube having a plurality of openings to receive said drain tube, said sump being larger than one of said plurality of horizontal posts, said sump being entirely below the plurality of hollow grow tubes; and i) a main supply line extending from said reservoir, a distribution manifold connected to said main supply line, a feeder tube extending from said misting assembly, said feeder tube connected to a distribution manifold.

* * * * *